Jan. 27, 1970        R. C. MOTT        3,491,945
FLUID PRESSURE SIGNAL CONVERTER
Filed July 18, 1967        2 Sheets—Sheet 1
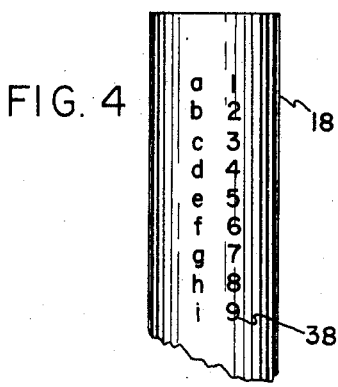
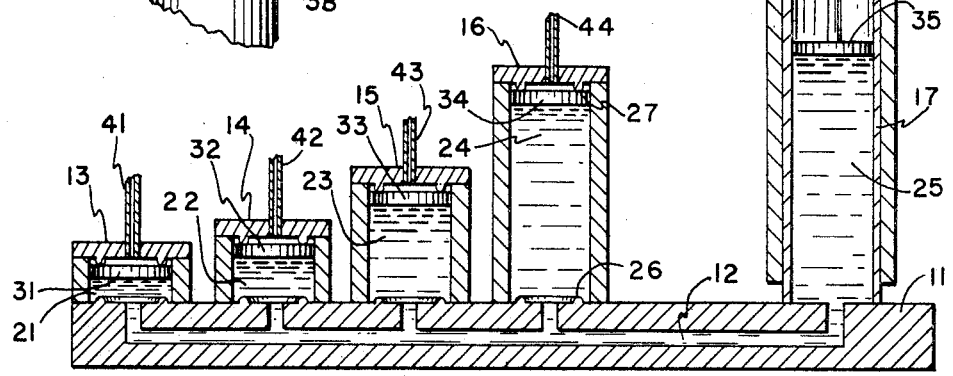
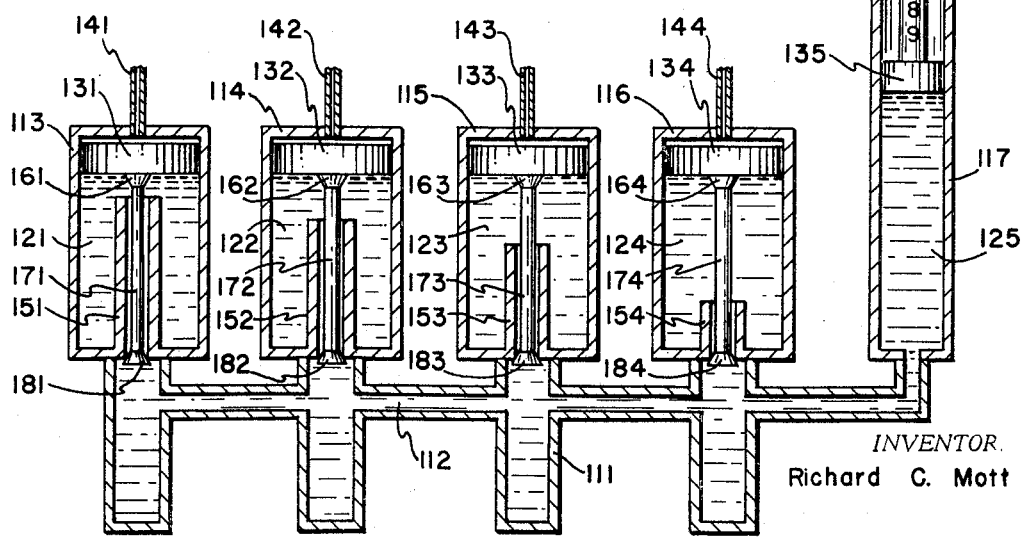
INVENTOR.
Richard C. Mott
BY Osmund R. Dahle
ATTORNEY

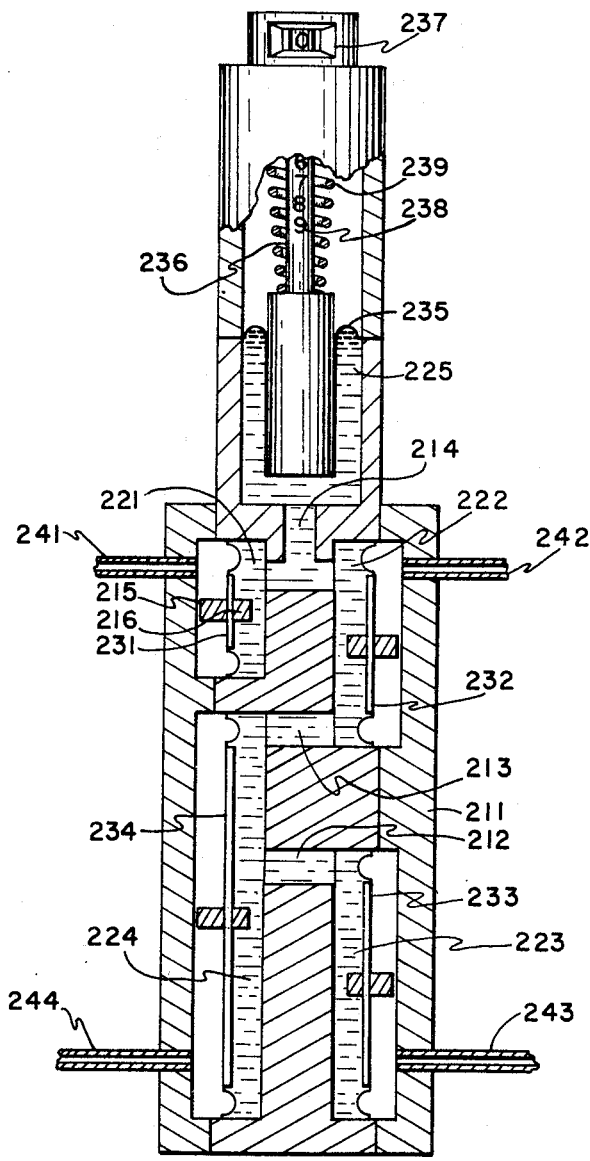

United States Patent Office 3,491,945
Patented Jan. 27, 1970

3,491,945
FLUID PRESSURE SIGNAL CONVERTER
Richard C. Mott, Harwood Heights, Ill., assignor to Honeywell Inc., Minneapolis, Minn., a corporation of Delaware
Filed July 18, 1967, Ser. No. 654,216
Int. Cl. G06m 1/12; G06d 1/00
U.S. Cl. 235—201                        10 Claims

ABSTRACT OF THE DISCLOSURE

A pneumatic digital to analog converter wherein pressure signals representing the respective place value of a digital number are each utilized to displace an amount of liquid corresponding to the place value represented, the total volume of displaced liquid being sensed to provide an analog output equivalent to the digital input.

Background of the invention

In the field of fluid pressure converters, to which this invention relates, certain features are believed advantageous, among them the ability of a device to receive input signals in any sequence, the lack of need to reset the device to an initial state after removal of the signals, proper operation in response to pressure signals in which accuracy of the magnitude of the signals is not a critical factor, ability of a device to convert input signals in various codes, and simplicity, both from a structural and operational standpoint.

Summary of the invention

The inventive concept lies in the displacement of a predetermined volume of liquid in response to a given combination of digital input pressure signals so that the total volume of liquid displaced represents the analog equivalent to the combination of digital signals. This is done by providing a pressure responsive device for each digital pressure signal that can displace a volume of liquid corresponding to the place value represented by the signal. In the binary code, for example, the first several place values are 1, 2, 4, 8, etc. In order to convert binary coded pressure signals to an equivalent analog output, it would therefore be necessary to assign the first pressure responsive device to displace one unit of liquid, the second to displace two units of liquid, the third to displace four units of liquid, the fourth to displace eight units of liquid, etc. The sum of the volumes displaced is then an accurate analog representation of the binary input.

Because the displacement of the liquid is not complex in nature, one of the primary features of the invention is its simplicity. The only structural requirements are an enclosure for a small body of liquid, a plurality of liquid displacing means to operate on the body of liquid and an output device for sensing the total volume of liquid displaced in response to a given combination of digital pressure signals. Simplicity of operation follows from the minimal structural requirements.

Due to the inherent qualities of a liquid, displacement can take place in any direction assuming that space is provided for the displaced liquid. Hence, proper operation will result notwithstanding the order in which the digital pressure signals are received. It should also be noted that the incompressible characteristics of a liquid permit the displaced liquid to transmit force instantaneously to the output device, thus resulting in a fast response to input signals.

The digital pressure signals can be of any reasonable magnitude, so long as they are of sufficient magnitude to cause the liquid displacing means to fully displace the proper amount of liquid. Accuracy of the magnitude of the presure signals is therefore not a significant factor.

As disclosed below, the inventive concept easily lends itself to the provision for automatic reset. A unique method of obtaining reset is by establishing a residual head of liquid pressure that continuously tends to return the body of liquid to its initial state. The automatic resetting feature is of particular importance where fast, repetitive readouts are necessary as, for example, in scanning operations.

Finally, a device incorporating the inventive concept can be adapted to convert pressure signals in various codes simply by fixing the volume capability of each liquid displacing means so that the respective place values of a particular code are properly represented.

While the embodiments below disclose devices used only for visual readout of the analog output, it should be mentioned that they can be adapted to actuate control devices as well.

Brief description of the drawings

FIGURE 1 is a cut-away view of one embodiment of the converter.
FIGURE 2 is another embodiment of the converter.
FIGURE 3 is a third embodiment of the converter.
FIGURE 4 is a perspective of the readout window of the converter.

Description of the preferred embodiments

In the embodiment of FIGURE 1, reference numeral 11 represents a housing in which there is formed a passageway 12. Attached to housing 11 and in sealed relation therewith are cylindrical members 13–16. The housing 11 and the cylindrical members 13–16 together define chambers 21–24, each of which communicates with passageway 12. Passageway 12 also communicates with a fifth chamber 25, which is defined by a cylindrical member 17 that is sealably attached to housing 11, a slidable member 18 and a piston 35 that is attached to slidable member 18 by rod 36. As can be seen in the figure, passageway 12 and chambers 21–25 are filled with a liquid such as water.

Each of the cylindrical members 13–16 has an opening into which is inserted tubes 41–44, which are adapted for connection with coded input pressure signals. Disposed within each of the chambers 21–24 are pistons 31–34, each of which is capable of displacing all of the liquid in its associated chamber upon application of a coded input pressure signal. Valve seats 26, 27 are provided for seating piston 34 in either of its extreme positions. Similar valve seats are provided for each of the other pistons.

A readout window 37 provides an output display which is represented by indicia 38 (see FIGURE 4) on the cylindrical member 18. As shown in FIGURE 4, more than one scale of indicia may be provided, the desired scale being put into use merely by rotating cylindrical member 18 until the scale can be seen through readout window 37.

It is assumed for purposes of operation that the several coded input pressure signals are of sufficient magnitude to displace the entire volume of liquid in their associated chambers. Upon application of an input pressure signal or signals to the inlets 41–44 a volume of liquid will be displaced by the pistons 31–34 actuated by input signals, the displaced liquid being transferred through the passageway 12, to the output chamber 25. Since all of the chambers 21–24 communicate with output chamber 25 through passageway 12, it follows that the volumes of liquid displaced in response to input pressure signals will be combined in the output chamber 25. This total volume of displaced liquid moves the piston 35 and cylindrical member 18 so that an output is indicated through the readout window 37.

If the size of the cylindrical members 13–16 is chosen so that members 21–24 assume a desired volume relationship, it will be appreciated that a predetermined volume of liquid will be displaced for a given combination of input pressure signals. If the chamber volume relationship is in the ratio of 8:4:2:1, as shown in FIGURE 1, the input pressure signals can be binary coded and the amount of liquid displaced in response to the input signals will represent the analog equivalent of the binary-coded input.

The device is provided with sufficient liquid so that the volume of output chamber 25 exceeds that of any other chamber. This establishes a residual head of liquid pressure between the output chamber 25 and chambers 21–24, and upon removal of input pressure signals the systems will return to an initial or zero position.

In FIGURE 2, a housing 11 is provided with a passageway 112 therein. Sealably attached to the housing 111 are cylindrical members 113–116 that form chambers 121–124. Disposed within and attached to the cylindrical members 113–116 are stand pipes 151–154 that provide communication between each of the input chambers 121–124 and the passageway 112.

Disposed within cylindrical member 113 is a piston 131 to which is attached an upper valve member 161, a rod 171, and a lower valve member 181. The valve members 161, 181 are arranged so that they alternately engage the stand pipe 151 when the piston 131 is in its uppermost and lowermost positions, thereby precluding communication between the chamber 121 and the passageway 112. Similar pistons 132–134, upper valve members 162–164, rods 172–174, and lower valve members 182–184 are provided for the cylindrical members 132–134 respectively. Inlet tubes 141–144 are adapted for connection with a source of coded input pressure signals, and establish communication with the upper side of the pistons 131–134 through openings in the cylindrical members 113–116.

Also communicating with passageway 112 is an output chamber 125 that is formed by a cylindrical member 117 and a piston 135. Attached to piston 135 is a scale member 136 upon which are placed indicia as shown at 138. A readout window 137 is provided within cylindrical member 117 for displaying the indicia that represents the output of the device.

In operation, a coded input pressure signal is transmitted to the cylindrical member 113, for example, whereupon it imparts a force to the upper side of piston 131, causing it to move downward and exhaust liquid from the chamber 121 until upper valve member 161 engages the stand pipe 171. The volume of liquid displaced is transferred to the output chamber 125 where it actuates piston 135 and member 136 to provide an output reading at window 137. Upon removal of the input pressure signal, the residual head described with regard to FIGURE 1 causes return of liquid to the chamber 121 until the lower valve member 181 engages stand pipe 171, thereby sealing chamber 121 from further entry of liquid.

The amount of liquid that pistons 131–134 are capable of exhausting from chambers 121–124 depends on the size of the pistons and the distance they move. The distance a piston moves is a function of the length of its associated stand pipe. If the size of the pistons 131–134 is the same and the length of each of the stand pipes 151–154 is chosen so as to establish a desired relationship between the distances that the pistons 131–134 move, it follows that a predetermined volume of liquid will be displaced for any combination of coded pressure signals. If these distances bear the ratio 8:4:2:1 to each other, the input pressure signals can again be binary coded and the amount of liquid displaced in response to a given combination of signals will represent the analog equivalent of the binary coded input.

In the embodiment disclosed in FIGURE 3, the operating principle is the same but the amount of liquid displaced is governed by varying the size of the several diaphragms while making the distances they move essentially the same. In the drawing a housing 211 is formed with interconnecting passageways therein. Disposed within housing 211 are diaphragms 231–234 that together therewith define chambers 221–224. Passageways 212–214 interconnect the chambers 221–224 and serve to transfer displaced liquid. Inlet tubes 241–244 are adapted for connection with a source of coded pressure signals and establish communication with the outer face of diaphragms 231–234 through openings in housing 211.

Diaphragm 231 is provided with a stop 215 that prevents excessive back movement and a stop 216 that determines the forward distance it can move. Each of the other diphragms 232–234 are provided with similar stops.

Passageway 213 communicates with an output pressure chamber 225 that is defined by housing 211 and a rolling diaphragm 235. As in the previous embodiments, chambers 221–225 and passageways 212–214 are filled with an operating liquid.

Attached to the rolling diaphragm 235 is an output scale member 236 upon which indicia 238 are placed. A coil spring 239 is disposed between housing 211 and output scale member 236 to provide an operating bias force. As the output scale member 236 moves up and down, the indicia 238 are displayed in a readout window 237.

As in the previous two embodiments, it is desirable to relate the volumes of liquid displaced by the diaphgrams 231–234 in response to coded input pressure signals. In this embodiment, this is done by holding equal the distances traveled by the several diaphragms and varying their effective surface areas. The volume of liquid displaced by any one diaphragm is equal to its effective surface area times the distance it moves, which is the same for all diaphragms. Hence, the relation of volume displaced will be the same as the relationship between diaphragm surface areas. If the surface areas are established in an 8:4:2:1 ratio, the device will be capable of converting binary coded input pressure signals to a singular analog output.

Since the inventive concept lies in the relationship of displaced volumes of liquid, it will be appreciated that different liquid displacing devices are capable of providing the displacing function. It has been suggested above to use pistons of the same size but having different strokes, or diaphragms having the same stroke but varying in size. It is evident that the size and stroke of the displacing means can be altered in any number of ways to establish the desired volume.

The embodiments of the invention in which an exclusive property or right is claimed are defined as follows:

1. A device for converting numerical information data, the data consisting of a plurality of coded pressure signals each of which represents a different place value of the numerical information data, comprising:
   an enclosure defining a chamber;
   a body of liquid disposed within the chamber;
   liquid displacing means for each of the coded pressure signals, cooperating with the enclosure and arranged so that in response to its associated pressure signal the liquid displacing means displaces a volume of liquid corresponding to the place value represented, the liquid displacing means each operable only in response to its own associataed pressure signal;
   accumulator means for accumulating the total volumes of liquid displaced by the respective liquid displacing means; and
   output means responsive to the total volume of liquid in the accumulator means for providing a cumulative output representative of the input numerical information data.

2. The converting means as defined in claim 1, wherein the liquid displacing means comprises a pressure responsive member movable in sealed relation with the chamber, the pressure responsive member having a preselected surface area and movable a predetermined distance, the area and distance chosen so that the pressure responsive member in response to its associated pressure signals displaces a volume of liquid corresponding to the place value represented.

3. The converting device as defined in claim 2, wherein the pressure responsive member is a diaphragm.

4. The converting device as defined in claim 2, wherein the pressure responsive member is a piston.

5. The converting device as defined in claim 4, wherein the display means includes a movable member having a plurality of indicating scales to provide a selection of output indications.

6. The converting device as defined in claim 1, wherein the liquid displacing means comprises a pressure responsive member movable in sealed relation with the chamber, the several pressure responsive members movable essentially the same distance and having pressure responsive surface areas corresponding to the respective place values of the numerical information data.

7. The converting device as defined in claim 1, wherein the output means comprises display means for visually indicating the total volume of liquid in the accumulator means.

8. The converting device as defined in claim 1, wherein the output means is adapted for connection to a control device so that the control device is actuated in response to the numerical information data.

9. The converting device as defined in claim 1, wherein reset means are provided for automatically returning the displaced liquid to its initial position upon removal of the coded input pressure signals.

10. The converting device as defined in claim 1, wherein the liquid displacing means comprises a pressure responsive member movable in sealed relation with the chamber, the several pressure responsive members having essentially the same pressure responsive surface areas, each member movable a distance corresponding to the place value represented in response to its associated pressure signal.

References Cited

UNITED STATES PATENTS

| | | | |
|---|---|---|---|
| 2,916,205 | 12/1959 | Litz | 235—201 |
| 3,437,268 | 4/1969 | White | 235—200 |
| 2,969,042 | 1/1961 | Litz et al. | 121—38 |
| 3,024,978 | 3/1962 | Frazier | 235—200 |

RICHARD B. WILKINSON, Primary Examiner

L. R. FRANKLIN, Assistant Examiner